US009883221B1

(12) United States Patent
Rogers (10) Patent No.: US 9,883,221 B1
(45) Date of Patent: Jan. 30, 2018

(54) SYSTEM AND METHOD FOR OPTIMIZING REAL-TIME VIDEO-ON-DEMAND RECORDING IN A CONTENT DELIVERY NETWORK

(71) Applicant: Concurrent Computer Corporation, Duluth, GA (US)

(72) Inventor: Thomas J Rogers, Perkasie, PA (US)

(73) Assignee: Concurrent Computer Corporation, Duluth, GA (US)

( * ) Notice: Subject to any disclaimer, the term of this patent is extended or adjusted under 35 U.S.C. 154(b) by 0 days.

(21) Appl. No.: 14/668,040

(22) Filed: Mar. 25, 2015

(51) Int. Cl.
| | |
|---|---|
| *H04N 21/472* | (2011.01) |
| *H04N 21/262* | (2011.01) |
| *H04L 29/06* | (2006.01) |
| *H04L 29/08* | (2006.01) |
| *H04N 21/6405* | (2011.01) |
| *H04N 21/647* | (2011.01) |
| *H04N 21/643* | (2011.01) |
| *H04N 21/61* | (2011.01) |
| *H04N 21/222* | (2011.01) |

(Continued)

(52) U.S. Cl.
CPC ... *H04N 21/26258* (2013.01); *H04L 65/4076* (2013.01); *H04L 65/4084* (2013.01); *H04L 67/1095* (2013.01); *H04N 21/222* (2013.01); *H04N 21/2387* (2013.01); *H04N 21/6125* (2013.01); *H04N 21/643* (2013.01); *H04N 21/6405* (2013.01); *H04N 21/64784* (2013.01); *H04N 21/8456* (2013.01)

(58) Field of Classification Search
CPC .................................................. H04N 21/47202
USPC .................................................. 725/93–95
See application file for complete search history.

(56) References Cited

U.S. PATENT DOCUMENTS

| 8,042,132 B2 | 10/2011 | Carney et al. |
|---|---|---|
| 8,489,760 B2 | 7/2013 | Visharam et al. |

(Continued)

FOREIGN PATENT DOCUMENTS

| JP | 2002318720 | 10/2002 |
|---|---|---|
| JP | 2005004615 | 1/2005 |

(Continued)

OTHER PUBLICATIONS

"A scalable video streaming approach using distributed b-tree", the University of British Columbia; Published in Apr. 2011; by Shantanu Khan Gramsci.

(Continued)

*Primary Examiner* — Hunter B Lonsberry
(74) *Attorney, Agent, or Firm* — Philip H. Burns, IV (57) ABSTRACT

A server complex (102) in a content delivery network (200) includes a central server (110), a multicast server (210), and an edge server (105). The central server delivers, with the multicast server, a content offering (120) to the edge server beginning at a predetermined time by transmitting portions (103) of content in succession, with each portion of content accompanied by an index fact datagram (204). The edge server stores each index fact datagram in an index file (215). When playing back content, the edge server retrieves an index file portion (404). When the information in the index file portion is exhausted, the edge server obtains any additional index fact datagrams (407) corresponding to any additional portions (408) of the content offering from the index file stored at the edge server.

20 Claims, 8 Drawing Sheets

(51) Int. Cl.
*H04N 21/2387* (2011.01)
*H04N 21/845* (2011.01)

(56) References Cited

U.S. PATENT DOCUMENTS

| | | |
|---|---|---|
| 8,516,529 B2 | 8/2013 | Lajoie et al. |
| 8,719,879 B2 | 5/2014 | Youssefmir et al. |
| 8,776,101 B2 | 7/2014 | Donoghue et al. |
| 8,856,852 B2 | 10/2014 | Sharif-ahmadi et al. |
| 2003/0120793 A1 | 6/2003 | Marjola |
| 2008/0235746 A1 | 9/2008 | Peters et al. |
| 2010/0058405 A1 | 3/2010 | Ramakrishnan et al. |
| 2010/0242079 A1 | 9/2010 | Riedl et al. |
| 2010/0250773 A1 | 9/2010 | Mao |
| 2010/0251313 A1 | 9/2010 | Mao |
| 2011/0093900 A1 | 4/2011 | Patel et al. |
| 2013/0144983 A1 | 6/2013 | Vantalon et al. |
| 2013/0246643 A1 | 9/2013 | Luby et al. |
| 2013/0254346 A1 | 9/2013 | McGowan |
| 2014/0059627 A1 | 2/2014 | Gonder et al. |
| 2014/0237525 A1 | 8/2014 | Rothschild et al. |
| 2014/0258449 A1 | 9/2014 | Holden et al. |
| 2015/0249854 A1* | 9/2015 | Knox .................. H04L 12/2805 725/92 |
| 2015/0334431 A1* | 11/2015 | Bjordammen ... H04N 21/23424 725/32 |

FOREIGN PATENT DOCUMENTS

| | | |
|---|---|---|
| JP | 2011044052 | 3/2011 |
| WO | 2010045511 | 4/2010 |

OTHER PUBLICATIONS

"An analysis and comparison of CDN-P2P-hybrid content delivery system and model", Journal of Communication 7.3; Published 2012; pp. 232-245.

"An Integrated, Interactive Application Environment for Session-Oriented IPTV Systems, Enabling Shared User Experiences", Published by Diss. Berlin Institute of Technology, 2011; Authored by Friedrich.

"Provider-Controlled Bandwidth Management for HTTP-based Video Delivery", Dissertation University of New Hampshire; Published 2012; Authored by Kevin J. Ma.

"White Paper", Survey and gap analysis for http streaming standards and implementations; Published 2010; Authored by Zong.

* cited by examiner

SYSTEM AND METHOD FOR OPTIMIZING REAL-TIME VIDEO-ON-DEMAND RECORDING IN A CONTENT DELIVERY NETWORK

BACKGROUND

Technical Field

This invention relates generally to a content delivery system, and more particularly to a video-on-demand system.

Background Art

Video-on-demand is becoming increasingly popular. With video-on-demand, a consumer can choose not only the content they wish to see, but also the viewing time as well. When a person orders a video-on-demand session, the selected content is delivered from a server to a receiving unit at the person's location, which is frequently a set-top box.

One issue associated with video-on-demand systems involves resource allocation. Servers are distributed across a network and managing bandwidth between client devices and serving servers in response to client requests for content offerings can be difficult. This difficulty is compounded when the content offering is being recorded in real time when the client request is made.

It would be advantageous to have a more efficient video-on-demand system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present invention, it should be observed that the embodiments reside primarily in combinations of method steps and apparatus components related to selecting local servers to serve a client request in a video-on-demand system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the selection of edge servers as described herein. The non-processor circuits may include, but are not limited to, network communication devices, routers, switches, video compression and decompression engines, and user video-on-demand devices. As such, these functions may be interpreted as steps of a method to perform edge server selection as described herein. It is expected that one of ordinary skill, notwithstanding possibly significant effort and many design choices motivated by, for example, available time, current technology, and economic considerations, when guided by the concepts and principles disclosed herein will be readily capable of generating such systems and methods with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and systems by which a client device in a video-on-demand system can start playback of a content offering that is currently being recorded without having to continually request index file updates. In prior art systems, when a client device requests a content offering, such as a television program, after the program has commenced but before it has completed, the client device would transmit a unicast request to a server for portions of the content and an index file. The index file included data corresponding to portions of the content offering that had been recorded at the time of the request. Once the content occurring from the predetermined start time and the request time had been viewed, the client device would need to repeatedly request retransmissions of the index file. As the index file is a continually growing cache of data, repeated transmissions of the ever increasing index files to multiple client devices causes bandwidth inefficiencies.

Embodiments of the present disclosure advantageously eliminate such bandwidth issues by leveraging index fact datagrams transmitted via a parallel path from a multicast server. Instead of continually requesting an index file that increases in size, once the content occurring from the predetermined start time and the request time is consumed, an edge server serving the client device simply obtains additional data from the series of index fact datagrams that have been received from a multicast server and cached at the edge server. In short, instead of requesting additional index files from a central server, the edge server simply draws additional data from its own cache, i.e., data received from a multicast channel, and incorporates that data into the index file originally received in response to the content offering request.

Video-on-demand network operators have provided an "on-demand" option for television programs for quite some time. For example, if an episode of the television program "Buster and Mackie" starts at 8:00 PM Eastern, subscribers have had the option to view the entire program upon request, even when that request comes after the predetermined start time of 8:00 PM. Illustrating by example, if a user requests Buster and Mackie at 8:10 PM Eastern, many video-on-demand networks provide a "start over" service that allows the user to start the program over from the beginning of the program while the actual program is being recorded at a central server. The offering of a "start over" feature required the video-on-demand delivery network to be able to deliver the content offering to a client device while the offering was being recorded.

Many legacy systems could not accomplish this task easily. Slowly, technical advances in various video-on-demand systems allowed this function to occur, thereby allowing the "start over" feature to be offered to more and more customers. However, these technical advances generally only applied to video-on-demand systems, which employed a wired, cable network directly coupling a central server to a client device. The introduction of content delivery networks, which are IP (Internet Protocol) systems in which video and audio content is delivered across a switched-packet network, has introduced new challenges and inefficiencies in providing the "start over" feature to which customers have become accustomed.

Illustrating by example, in a content delivery network content is generally delivered from a central server to an edge server located proximately with one or more client devices. This intermediate delivery to the edge server results in the edge server losing knowledge of the actual, current length of the content offering as it is being recorded. This is true because in content delivery networks the recording operation occurs at a central server, while the delivery of playback to a client device occurs from an edge server.

One essential for proper content delivery from an edge server is the availability of an index file. An index file is essentially a playlist in a streaming content delivery network that contains a list of the media files transmitted in a streaming system. The index file can also include metadata corresponding to a content offering. Client devices use the index file to properly construct the media files in the proper order during playback.

The edge server relies upon mapping of the "normal play time" of a particular content offering to the media file byte offsets when executing the "start over" function. Moreover, edge servers employ normal play time offsets into corresponding byte offsets into trick-play files to support trick play, such as fast forward, rewind, pause, and so forth. Said differently, access to the index file is an imperative for an edge server in a content delivery network to properly play a content offering and to perform trick play operations. The index file allows the edge server to support fast movement forward and backward in a content offering, as well as for resuming playback of the content offering and ensuring that the user does not fast-forward past the end of the content offering as it is being recorded.

As noted above, in prior art systems, an edge server must continually request new index files from a central server when a user begins consuming a content offering while it is being recorded at a central server. Since the index file by definition gets longer as more of the content offering is recorded, repeated transmission of the index file to multiple devices causes bandwidth inefficiencies. This is especially true when multiple edge servers are simultaneously streaming a popular content offering as it is being recorded.

Embodiments of the present disclosure provide a system and method for broadcasting index fact datagrams from a central server recording a content offering to all edge servers via a multicast server. This broadcast of datagrams through the multicast channel eliminates the need of an edge server to constantly request new index files. Instead, the edge server simply caches the datagrams as they are received for assemblage into an ad hoc index file. Once data in an initially delivered partial index file is used, the edge server draws additional data from the ad hoc index file instead of requesting new index files from the central server, thereby removing bandwidth inefficiencies.

In one embodiment, a multicast server delivers a content offering to an edge server beginning at a predetermined time. In one embodiment, the predetermined time is the time that a central server begins recording the content offering as it is received from a content provider. In one embodiment, this delivery includes delivering portions of content in succession, where each portion of content is accompanied by an index fact datagram to be included in an index file stored at the edge server.

When the edge server requests the content offering in response to a client device request at a request time occurring after the predetermined time, in one embodiment the central server delivers one or more portions of the content offering and an index file portion comprising all index fact datagrams delivered by the multicast server between the predetermined time and the request time. In addition, the central server delivers an instruction to the edge server to, when reaching a last index fact datagram of the index file portion, obtain any additional index fact datagrams corresponding to any additional portions of the content offering from the index file stored at the edge server. This eliminates the need for the edge server to repeatedly request new index files from the central server, thereby saving bandwidth in the system.

Figure 1:
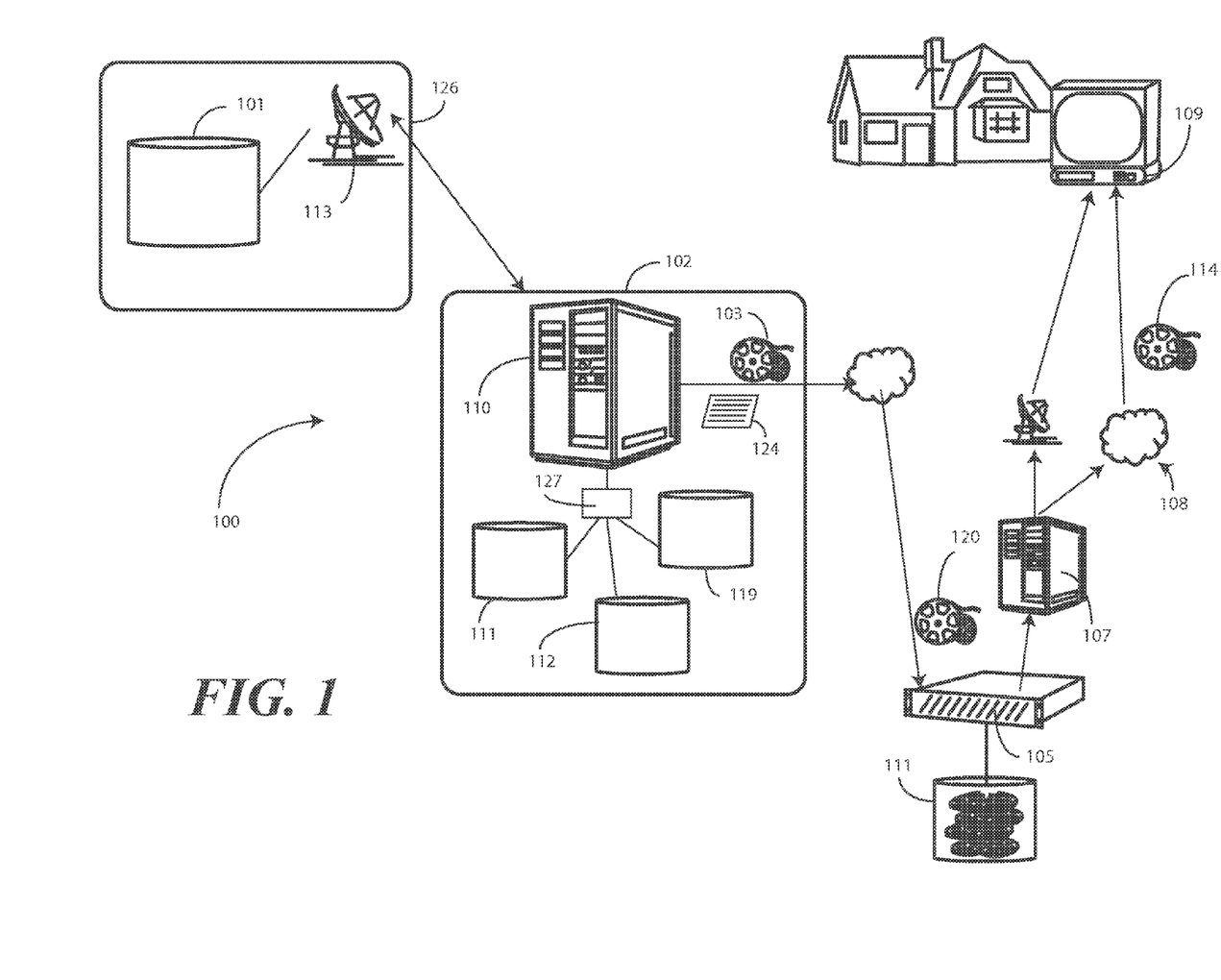
FIG. 1 illustrates one explanatory video-on-demand system in accordance with one or more embodiments of the disclosure.

Turning now to FIG. 1, illustrated therein is a content delivery system 100 configured with video-on-demand functionality. The content delivery system 100 of FIG. 1 stores content offerings on a local storage device or cache 111 proximately located with an edge server 105. The stored content offering 112 is then delivered to the requestor of a video-on-demand session by way of a streaming server 107.

When new content offerings are ready for delivery to the content delivery system 100, a content provider 101 delivers the content offering 120 to a server complex 102. The content offering 120 can comprise any type of data, but for ease of illustration will be referred to as video content, as well as associated audio content, metadata, or other content, suitable for use in a video-on-demand session. By way of example, the content can be digitally compressed video content that can be demultiplexed and stored in a convenient format such as MPEG, MPEG 2, or MPEG 4. It will be clear to those of ordinary skill in the art having the benefit of this disclosure that other types of content could be used with the systems, methods, and devices described herein. The content provider 101 can provide the content offering 120 in various formats. For example, the system may receive radio-frequency signals by satellite 113 or data packets by land-based communication networks. In another embodiment, the system may receive adaptive bitrate packets by satellite 113 or terrestrial network.

In one or more embodiments, the server complex 102 records the content offering 120 into a cache 111 at the server complex 102. For example, if the content provider 101 is a network, and the content offering 120 is a television program or movie, the server complex 102 may record the content offering 120 from a predetermined start time until completion. The server complex 102 then is operable to deliver the content offering 120 to components across the content delivery system 100 as needed and/or as directed. In some cases, this delivery is based upon demand requests from an edge server 105.

The edge server 105, in one embodiment, is a device capable of requesting and storing quantities of data, including but not limited to video content and other types of content. In one embodiment, the edge server 105 is operable with a streaming server 107 to deliver video-on-demand content 114 across an interactive network 108 upon the request of a subscriber device 109. The subscriber device 109 can be any number of types of devices. For example, in FIG. 1, subscriber device 109 is a set-top box coupled to a monitor or television at a person's home. However, the subscriber device 109 can be other types of devices as well, including a smartphone, a tablet computer, a laptop computer, or a desktop computer. These types of devices are illustrative only, as others will be obvious to those of ordinary skill in the art having the benefit of this disclosure.

The server complex 102 can include one or more servers. In FIG. 1, the server complex 102 is shown has having only a central server 110 for brevity. In one embodiment, the central server 110 of the server complex 102 records content offerings as they are received by storing the content offerings in a content database 112. The central server 110 of the server complex 102 can optionally process and/or reformat the content offering as necessary for delivery to the edge server 105 or the subscriber device 109. The content database 112, in one embodiment, comprises a disk array. The disk array may be a JBOD (just a bunch of disks) or RAID (redundant array of inexpensive disks) with various architectures and interfaces, such as FC-AL (Fiber Channel-Arbitrated Loop) or SSA (Serial Storage Architecture).

In one or more embodiments the server complex 102 and/or central server 110 includes one or more processors 127 and, optionally, a relational database management system 119. The relational database management system 119 can function, in one or more embodiments, as a server or storage device. The storage devices of the relational database management system 119 can contain a listing or table of one or more of the following: the content providers 101, the content offerings 120, index files 124, etc., the edge servers 105 upon which the content offering 120 is stored, and so forth.

When user requests video-on-demand content 114 with a subscriber device 109, the subscriber device requests the video-on-demand content 114 from an edge server. In one embodiment, the edge server is a HTTP (hypertext transfer protocol) client of the central server 110. Accordingly, the edge server 105 makes the request by sending an HTTP GET command to the central server 110. In the case where the video-on-demand content 114 is a content offering 120 that is currently being recorded by the central server 110, the central server sends one or more portions of the content offering 103 and an index file 124 to the edge server 105. The edge server 105 then delivers the one or more portions of the content offering 103 to the subscriber device 109 via the streaming server 107 as video-on-demand content 114.

Once the one or more portions of the content offering 103 have been delivered, the edge server 105 must send another HTTP GET request to the central server 110 for more content portions. When this occurs, the central server 110 delivers another index file 124 to the edge server 105. This process repeats, with the edge server 105 making more and more requests for content portions and index files. As noted above, the index files become longer and longer. This results in consumption of more bandwidth when delivering these longer files. When many edge servers 105 perform this operation repeatedly during a popular content offering, bandwidth spikes can be extreme. Some content delivery network service providers are not able to sustain these spikes due to network limitations.

Embodiments of the present disclosure provide a system and method for broadcasting index fact datagrams from the real-time recording system, i.e., the central server 110, out to edge servers 105 using a multicast server. The system and method eliminate the need for the edge server 105 to constantly reread the "ever-changing index file." Turning now to FIG. 2, illustrated therein is the server complex 102 of FIG. 1 in operation with a multicast server 210.

Figure 2:
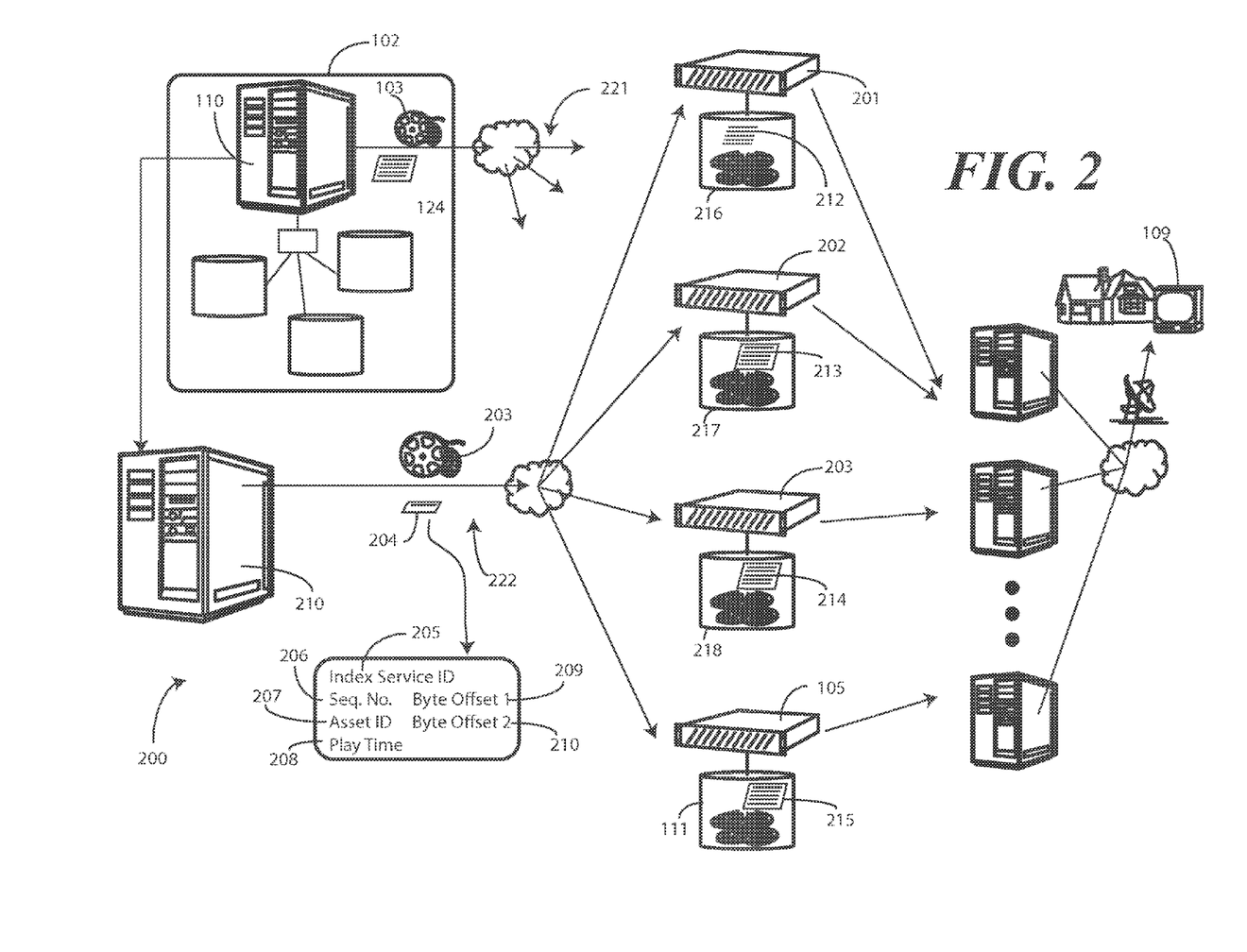
FIG. 2 illustrates another explanatory video-on-demand system in accordance with one or more embodiments of the disclosure.

The server complex 102 of FIG. 2 is capable of operating in the unicast method described above with reference to FIG. 1 where the edge server 105 transmits requests for content offerings to the central server 110. The central server 110 can then deliver one or more portions of the content offering 103 and the index file 124 through a unicast channel 221 to the edge server 105.

However, in addition, the content delivery network 200 of FIG. 2 also includes a multicast path 222 though which the multicast server 210 may deliver one or more portions of a content offering 203 to multiple edge servers 105,201,202, 203 at the same time. For example, when a popular television show is airing, the server complex 102 may elect to cause the multicast server 210 to deliver one or more portions of the content offering 203 to a plurality, or all, edge servers 105,201,202,203 in the system.

In one or more embodiments, each portion of the content offering is accompanied by an index file datagram 204. In one embodiment, the index file datagram 204 includes at least the following fact information: An originator identifier that identifies the indexing service of the server complex 102 transmitting the index fact datagram 204; a sequence number 205; an content offering identifier 207 that identifies the content offering to which the index file datagram 204 corresponds; a normal play time 208 of the content offering to which the index file datagram 204 corresponds; a byte offset 209 into the content offering to which the index file datagram 204 corresponds; and a byte offset 211 into a trick file of the content offering to which the index file datagram 204 corresponds. This fact information is explanatory only, as other information suitable for use as an index file datagram 204 will be obvious to those of ordinary skill in the art having the benefit of this disclosure.

In one embodiment, the sequence number 205 is set such that zero is included with the first index fact datagram 204, which corresponds to the predetermined start time of the recording of a content offering. In one embodiment, the byte offset 211 into the trick file comprises multiple byte offsets. For example, this byte offset 211 can include a byte offset for each trick speed and/or trick play direction if different trick files for each speed and direction are used. In one embodiment, the index file datagram 204 can be defined within a structure complete with length and checksum features providing the required appropriate robustness.

Rather than handling all the HTTP GET commands from various edge servers 105,201,202,203 as described above with reference to FIG. 1, which cause tremendous bandwidth spikes, the inclusion of the multicast server 210 in content delivery system 200 pushes index file datagrams 204 to the edge servers 105,201,202,203. In one embodiment, each edge server 105,201,202,203 can then assemble each of these index file datagrams 204 into an index file 212,213, 214,215 that can be stored in a cache 111,216,217,218 operable with each edge server 105,201,202,203. Said differently, in one embodiment each edge server 105,201,202, 203 includes an indexing component that writes the index fact datagrams 204 to an index file 212,213,214 as a content offering is being recorded at the central server 110 and is being delivered to the edge servers 105,201,202,203. In one or more embodiments, this indexing component is updated as the index fact datagrams 204 are being received. The indexing component writes these index fact datagrams 204 to the index file 212,213,214,215 of its cache 111,216,217, 218. Embodiments of the disclosure leverage this ad hoc index file 212,213,214,215 stored in each cache 111,216, 217,218 to eliminate the need for the edge server to constantly reread the "ever-changing index file" as described above with reference to FIG. 1.

Figure 3:
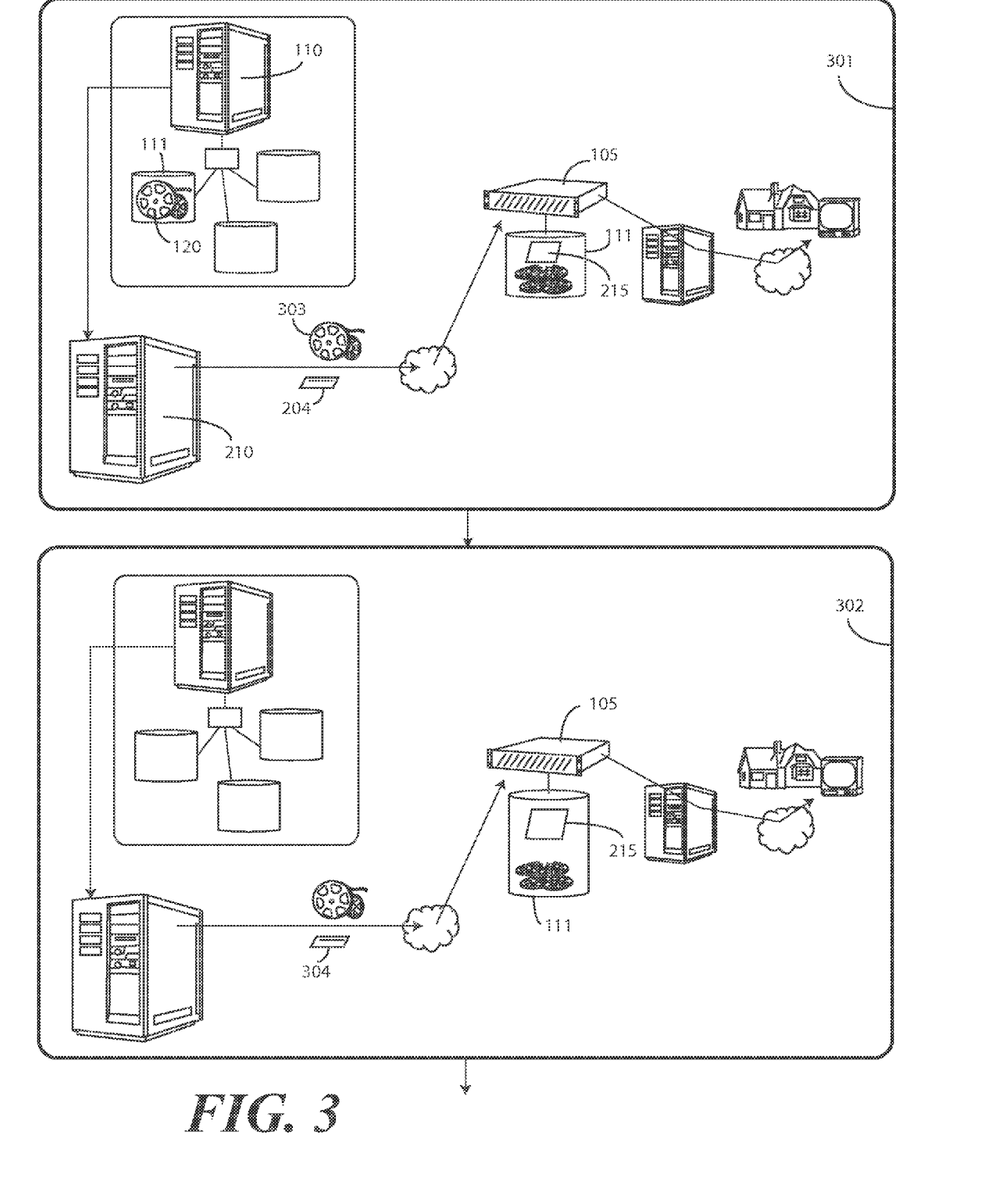
FIGS. 3-5 illustrate an explanatory method of delivering content offerings being recorded in real time in response to client requests in accordance with one or more embodiments of the disclosure.

FIG. 3 illustrates how this occurs in one embodiment. Turning now to FIG. 3, at step 301 a central server 110 begins receiving a content offering 120 at a predetermined time. In one embodiment, the predetermined time is the start time when the central server 110 begins receiving the content offering 120 from a content provider (101). Illustrating by example, if the content offering 120 is a television program delivered from a network at 8:00 PM Eastern, the predetermined time may be 8:00 PM. When this occurs, to provide video-on-demand functionality, in one embodiment the central server 110 begins recording the content offering 120 to its cache 111.

When this occurs, in one embodiment the central server 110 then delivers, with the multicast server 210, the content offering 120 to an edge server 105 beginning at the predetermined time. In one embodiment, this delivery includes delivering portions of content 303 in succession. In one embodiment, each portion of content 303 is accompanied by an index fact datagram 204. As described with reference to FIG. 2 above, each index file datagram 204 is to be included in an index file 215 stored in a cache 111 at the edge server 105. This process repeats at step 302 as the recording of the content offering 120 continues, with additional index fact datagrams 304 being written to the index file 215 stored in a cache 111 at the edge server 105.

Figure 4:
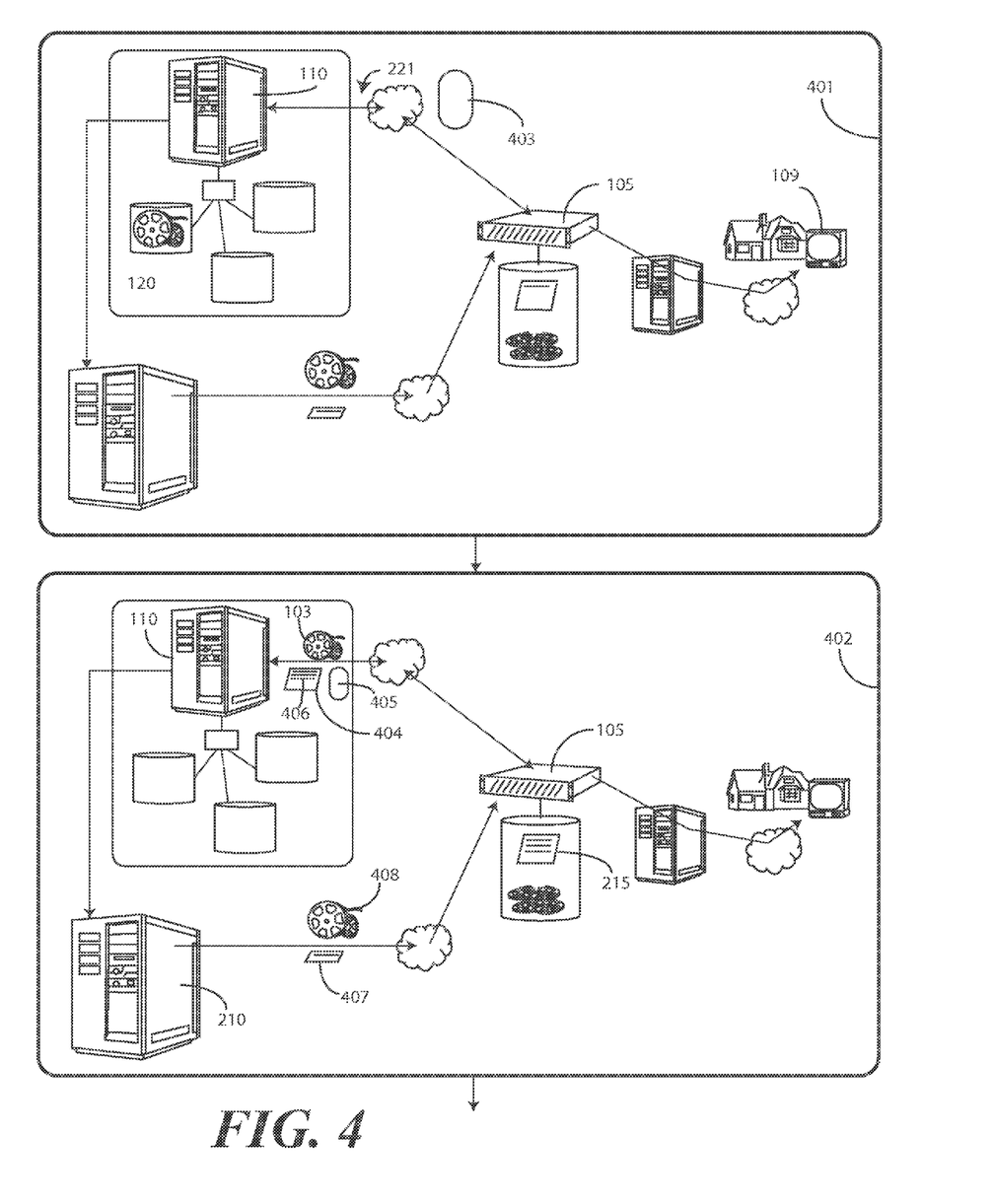

Turning now to FIG. 4, at step 401 a subscriber device 109 requests playback of the content offering 120. In one embodiment, this occurs while the central server 110 is recording the content offering 120. Accordingly, the edge server 105 serving the subscriber device 109 transmits a request 403 for the content offering at a request time occurring after the predetermined time. For example, if the predetermined time was 8:00 PM Eastern, and the content offering 120 were a 30-minute sitcom, the request time may be something after 8:00 PM but before 8:30 PM, such as 8:10 PM. In one embodiment, the request 403 comprises an HTTP GET request sent through the unicast channel 221.

The central server 110 receives this request 403 at step 402. In response to receiving the request 403, in one embodiment the central server 110 delivers, to the edge server 105, one or more portions 103 of the content offering 120. The central server 110 also delivers an index file portion 404 corresponding to the one or more portions 103 of the content offering 120. For example, where the request time is 8:10 PM, the index file portion 404 may be a playlist for portions of the content offering 120 recorded by the central server 110 between 8:00 PM and 8:10 PM. In one embodiment, the playlist comprises a list of index file datagrams comprising the information described above with reference to FIG. 2.

In accordance with one or more embodiments of the disclosure, the central server 110 also sends a third item, namely, an instruction 405 to the edge server 105 to, when reaching a last index fact datagram 406 of the index file portion 404, obtain any additional index fact datagrams 407 corresponding to any additional portions 408 of the content offering from the index file 215 stored at the edge server 105.

The edge server 105 then receives the one or more portions 103 of the content offering 120, the index file portion 404 corresponding to the one or more portions 103 of the content offering 120, and the instruction 405. While this information can be used to serve the initial user request, the edge server 105 continues to receive additional index file datagrams 407 from the multicast server 210. The edge server 105 then amends its index file 215 with these additional index fact datagrams 407.

This process allows an optimization of real-time recording of content offerings 120 within the a content delivery environment in that edge servers 105 will not have to constantly reread the remote index files of each "start over" content offering they are streaming. Instead, when the information in the index file portion 404 is used, the edge server 105 simply receives any additional index fact datagrams 407 corresponding to any additional portions 408 of the content offering from the index file 215 stored at the edge server 105. This advantageously reduces storage requirements at the central server 110. The scalability, reliability, and serviceability of both the edge server 105 and the central server 110 both benefit from embodiments of the disclosure.

Figure 5:
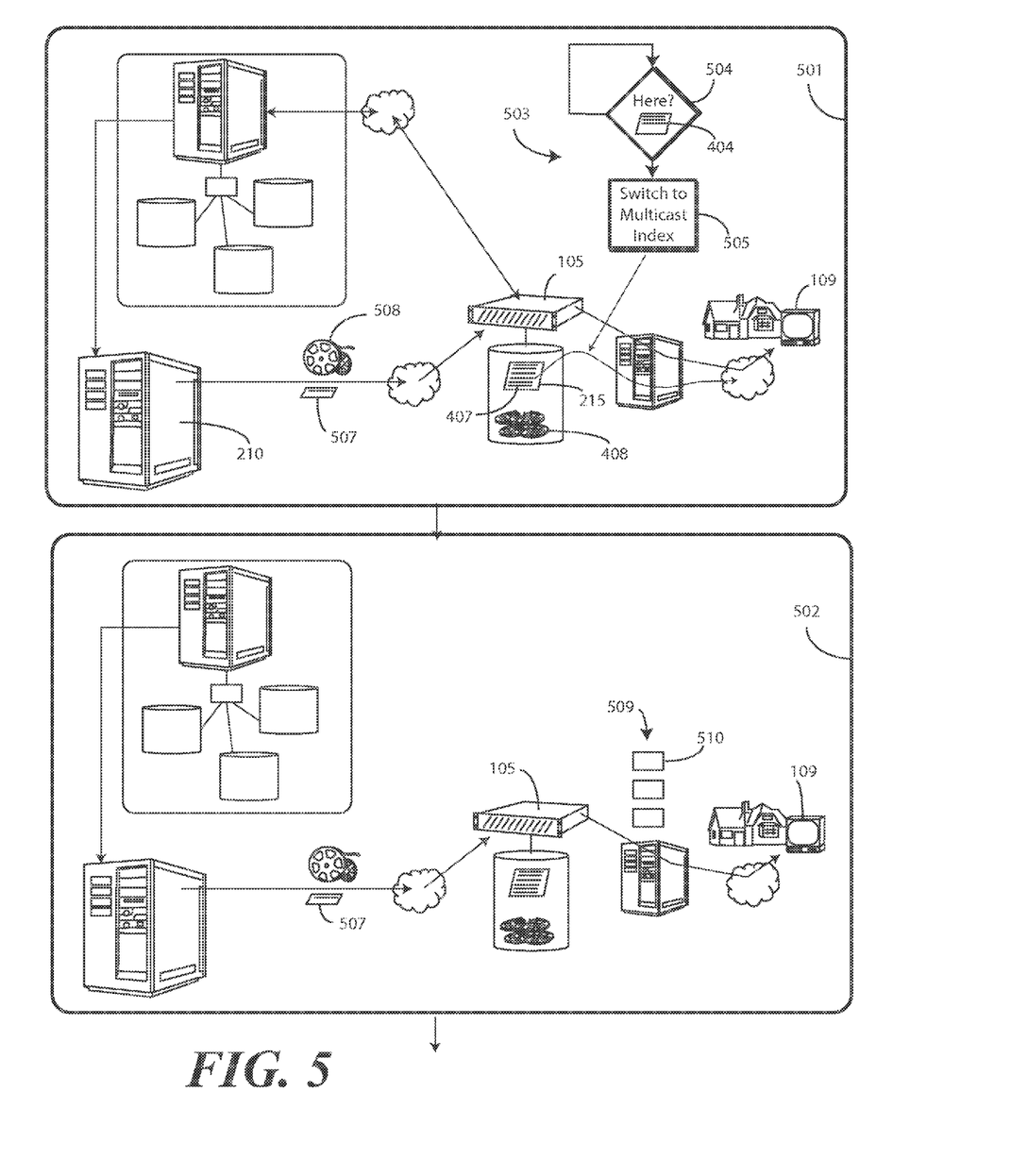

Turning to FIG. 5, at step 501 the edge server 105 receives the one or more portions (103) of the content offering (120), the index file portion 404 corresponding to the one or more portions (103) of the content offering (120), and the instruction (405) to, when reaching a last index fact datagram 406 of the index file portion 404, obtain any additional index fact datagrams 407 corresponding to any additional portions 408 of the content offering from the index file 215 stored at the edge server 105. The edge server 105 then executes a method 503 while playing out the content offering (120) to the subscriber device 109. This is best illustrated by example.

Presume that a user requests the show "Buster and Mackie," which started airing at 8:00 PM, at 8:10 PM. The index file portion 404 can then provide a playlist for portions of the content offering (120) recorded by the central server 110 between 8:00 PM and 8:10 PM. As long as the user is navigating within that window, be it via continuous play, fast forward trick play, rewind trick play, executing a "start over" function, and so forth, the edge server 105 utilizes the index file portion 404 to provide this playout.

However, when the user reaches the 8:10 PM mark, either by fast forward trick play or by simply watching the program, as determined at decision 504, the edge server 105 retrieves additional index file information from the index file 215 stored at the edge server 105, which continues to incorporate index fact datagrams 507 from the multicast server 210. Said differently, when the edge server 105 reaches a portion of the content offering (120) occurring at the request time, at step 505 the edge server 105 obtains index fact datagrams 507 corresponding to any additional portions of the content 508 from a multicast server 210, either in real time or from the index file 215 stored at the edge server 105.

Step 502 illustrates the edge server 105 delivering playout 509 of the content offering (120) to the subscriber device 109 based upon the index file 215 stored at the edge server 105. In one embodiment, this step 502 comprises delivering trick content 510 to the subscriber device 109 as a function of the data in the index file 215. If the playout 509 is such that the edge server 105 is receiving additional index fact datagrams 507 in real time, the trick content 510 can be a function of the data in those index fact datagrams 507.

Figure 6:
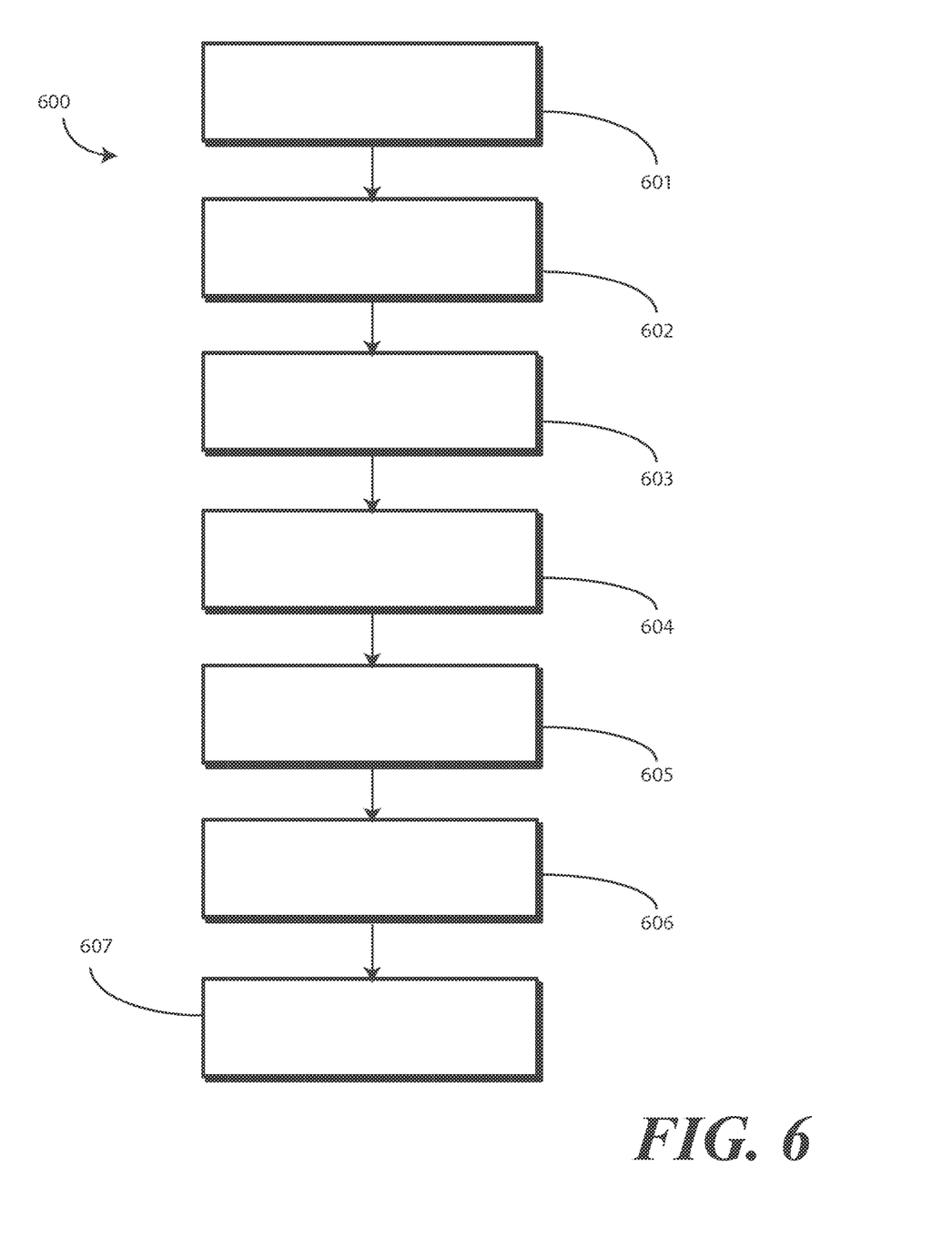
FIG. 6 illustrates another explanatory method of delivering content offerings being recorded in real time in response to client requests in accordance with one or more embodiments of the disclosure.

Turning now to FIG. 6, illustrated therein is one method 600 in accordance with one or more embodiments of the disclosure. At step 601, the method 600 delivers, with a multicast server, a content offering to an edge server beginning at a predetermined time. In one embodiment, step 601 includes delivering portions of content in succession, with each portion of content accompanied by an index fact datagram to be included in an index file stored at the edge server.

At step 602, the method 600 receives, at a central server operable with the multicast server, a request for the content offering. In one embodiment, step 602 occurs at a request time that is later than the predetermined time of step 601. In one embodiment, the request comprises an HTTP GET request for at least a portion of the content offering.

At step 603, the method 600 delivers, also with the central server, one or more portions of the content offering. At step 604, the method 600 delivers an index file portion comprising all index fact datagrams delivered by the multicast server between the predetermined time and the request time. At step 605, the method 500 delivers an instruction to the edge server to, when reaching a last index fact datagram of the index file portion, obtain any additional index fact datagrams corresponding to any additional portions of the content offering from the index file stored at the edge server. In one embodiment, steps 603-605 occur in response to the receiving step 602.

In one embodiment, the index fact datagram delivered at step 605 includes a sequence number. In one embodiment, the sequence number is zero at the predetermined time occurring at step 601. In one embodiment, the index fact datagram delivered at step 605 comprises an content offering identifier. In one embodiment, the index fact datagram delivered at step 605 includes a byte offset in the content offering. In one embodiment, the index fact datagram delivered at step 605 comprises a byte offset in one or more trick files corresponding to the content offering.

At step 606, the method 600 plays back the content offering to a subscriber device. In one embodiment this playback is a function of the index file portion. At a later time, such as when information in the index file portion is consumed, the method 600 switches from the index file portion to a streaming channel from a streaming server to acquire index fact datagrams. At step 607, the method 600 plays back the content offering as a function of the index fact datagrams received from the streaming server. The playback of either step 606 or step 607 can comprise trick playback.

Figure 7:
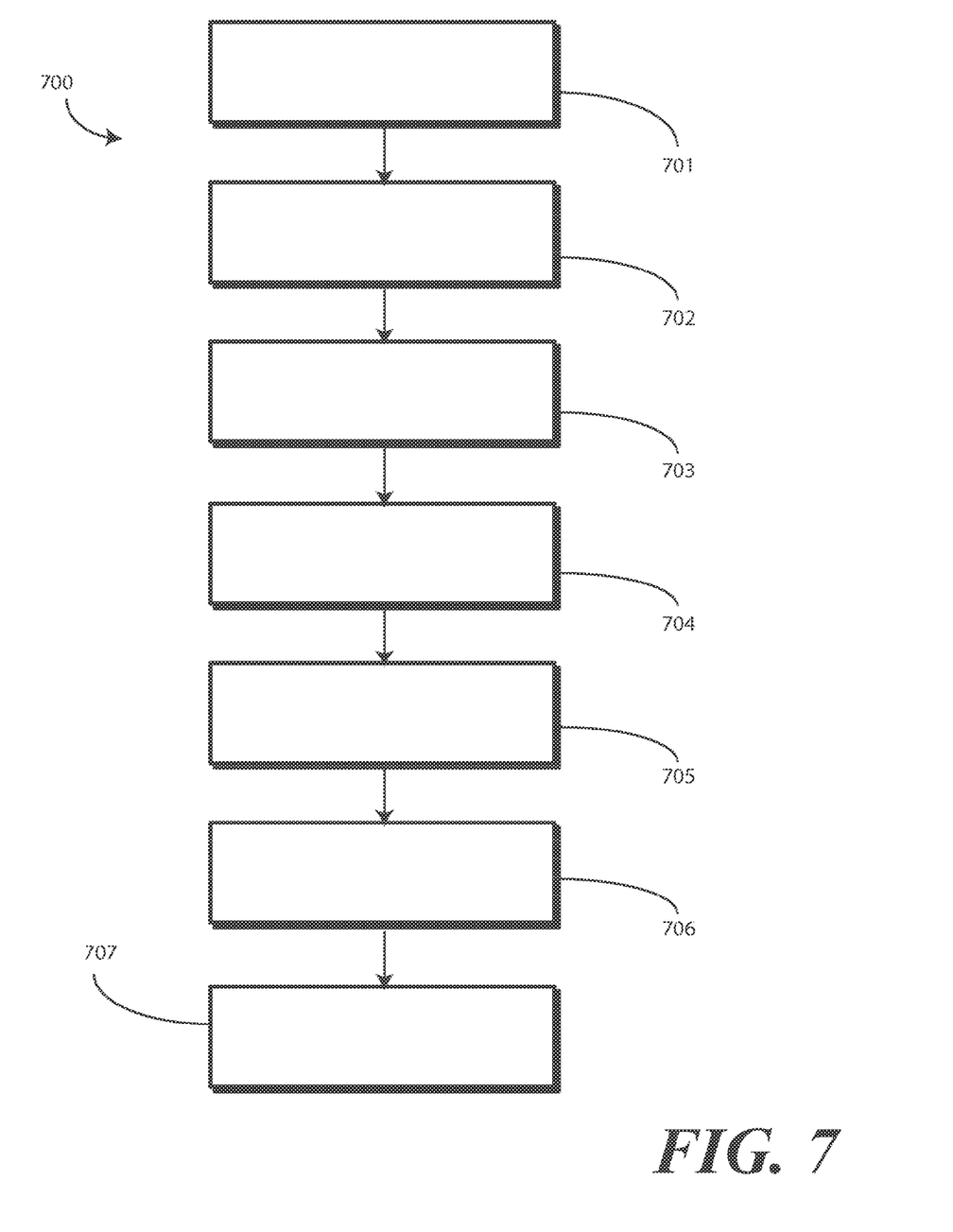
FIG. 7 illustrates another explanatory method of delivering content offerings being recorded in real time in response to client requests in accordance with one or more embodiments of the disclosure.

Turning now to FIG. 7, illustrated therein is another method 700 in accordance with one or more embodiments of the disclosure. At step 701, the method 700 transmits, with an edge server, a request for a content offering. In one embodiment, the content offering is scheduled to begin at a predetermined time. However, in one embodiment step 701 occurs at a request time that is later than the predetermined time. In one embodiment, the transmitting of step 701 comprises sending an HTTP GET request to a central server.

At step 702, the method 700 includes receiving, at the edge server, one or more portions of the content offering. At step 703, the method 700 includes receiving an index file corresponding to the one or more portions of the content offering. At step 704, the method 700 includes receiving an instruction to, when reaching a portion of the content offering occurring at the request time, obtain index fact datagrams corresponding to any additional portions of the content from a multicast server. In one embodiment, steps 702-704 occur in response to the transmitting of step 701. The index fact datagrams are received at step 705.

In one embodiment, the index fact datagrams received at step 705 comprise a byte offset in the content offering. In one embodiment, the index fact datagrams receives at step 705 comprise a byte offset in one or more trick files corresponding to the content offering.

At step 706, the method 700 comprises amending the index file with the index fact datagrams. At step 707, the method 700 includes delivering, with the edge server, trick content to a client device that is a function of data in the index file.

Figure 8:
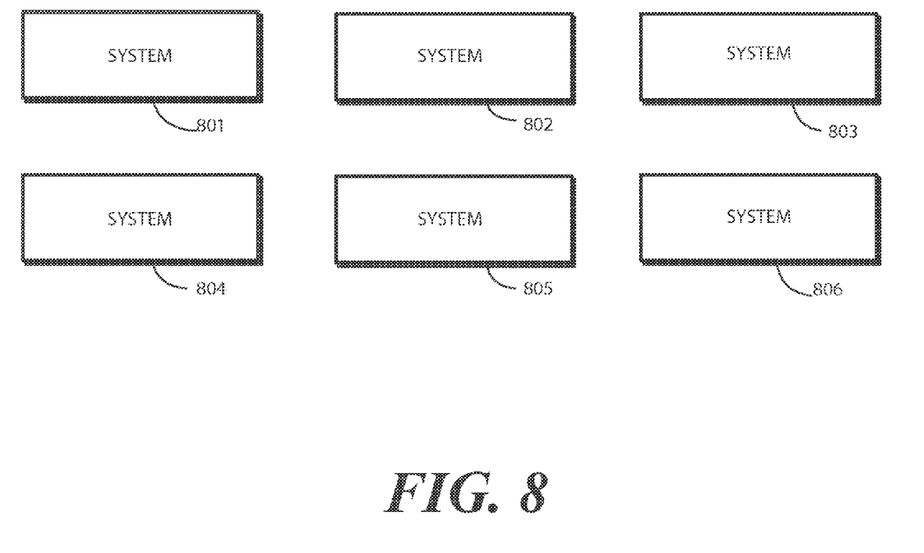
FIG. 8 illustrates one or more embodiments of the disclosure.

Turning now to FIG. 8, illustrated therein are various embodiments of the disclosure. At 801, a server complex in a content delivery network comprises a central server, a multicast server, and an edge server. At 801, the central server comprises one or more processors. At 801, the one or more processors are to deliver, with the multicast server, a content offering to the edge server. At 801, the content offering begins at a predetermined time. At 801, the one or more processors deliver the content offering by transmitting, across a network, portions of content in succession. At 801, each portion of content is accompanied by an index fact datagram.

At 801, the edge server comprises another one or more processors to store, in a memory device at the edge server, each index fact datagram in an index file. At 801, the one or more processors of the central server are to receive a request for the content offering at a request time. In one embodiment, the request time occurs after the predetermined time. At 801, the one or more processors of the central server are to deliver one or more portions of the content offering, an index file portion comprising all index fact datagrams delivered by the multicast server between the predetermined time and the request time, and an instruction to the edge server to, when reaching a last index fact datagram of the index file portion, obtain any additional index fact datagrams corresponding to any additional portions of the content offering from the index file stored at the edge server.

At 802, the another one or more processors of the edge server are to deliver trick content to a client device as a function of data in one or more of the additional index fact datagrams. At 803, the request of 801 comprises an HTTP GET request. At 804, the index fact datagrams of 801 comprise a byte offset in the content offering. At 805, the index fact datagrams of 801 comprise a byte offset in one or more trick files corresponding to the content offering. At 806, the index fact datagrams of 801 comprise a sequence number. In one embodiment, the sequence number is set to zero at the predetermined time.

As noted above, a primary challenge facing prior art architectures supporting content delivery networks is the fact that the edge server, which is not the server performing a recording function, is responsible for playback of content offerings recorded by the central server. Since the edge server is not performing the recording, the edge server has no knowledge of the actual length of the recording.

To compound matters, the only way that the edge server can properly perform the playback operation is by having an index file that includes a mapping of the "normal play time"

to content offering file byte offsets. The index file can also include normal playtime offsets that correspond to byte offsets of trick files as well. In short, the index file is used by the edge server for playback, trick plays, skipping forward in an content offering, skipping backward in an content offering, pausing and resuming play of the content offering, and ensuring that a user does not fast forward or rewind past the end or beginning of an content offering, respectively, as it is being recorded.

As also noted above, many legacy content delivery networks are inefficient at continually serving index files, which constantly change and grow as a recording occurs. Prior art central servers must repeatedly serve the growing index file for each recording content offering to edge servers as the edge servers play out content. This is especially inefficient when considering the fact that many edge servers can each be streaming many popular content offerings as they are being recorded.

Advantageously, embodiments of the disclosure illustrated and described above provide a system and method for broadcasting index file datagrams through a multicast server from the real-time recording system out to edge servers. By instructing latecomers to switch to this stream after exhausting an initial index file portion, embodiments of the disclosure eliminate the need for the edge server to constantly reread the "ever-changing index file."

In one or more embodiments, a central server creates index file data and writes it to storage at the central server as content offerings are being recorded. The central server then broadcasts index fact datagrams from a multicast server. In one embodiment, each index fact datagram includes the identity of the central server sending the datagram, a sequence number, with the beginning of recording indicated by sequence number zero, a content offering identifier, a normal play time, a byte offset in the main content offering, and a byte offset into one or more trick files.

As these index fact datagrams are broadcast, each edge server updates its own in-memory index file, and/or persists the index information to cache or storage at its discretion. The first time that an edge device begins playback of an content offering being recorded, it receives an index file portion from the central server. After the information in this index file portion is exhausted, the edge device simply retrieves additional index information from its cache rather than requesting new index files.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a content delivery network, the method comprising:
   delivering, with a multicast server, a content offering to an edge server beginning at a predetermined time, the delivering comprising delivering portions of content in succession, wherein each portion of content accompanied by an index fact datagram to be included in an index file stored at the edge server;
   receiving, at a central server operable with the multicast server, a request for the content offering at a request time occurring after the predetermined time;
   also delivering, with the central server, in response to the receiving:
      one or more portions of the content offering;
      an index file portion comprising all index fact datagrams delivered by the multicast server between the predetermined time and the request time; and
      an instruction to the edge server to, when reaching a last index fact datagram of the index file portion, obtain any additional index fact datagrams corresponding to any additional portions of the content offering from the index file stored at the edge server.

2. The method of claim 1, wherein each index fact datagram comprises a sequence number.

3. The method of claim 2, wherein the sequence number is zero at the predetermined time.

4. The method of claim 2, wherein the each index fact datagram comprises a content offering identifier.

5. The method of claim 4, wherein the each index fact datagram comprises a byte offset in the content offering.

6. The method of claim 4, wherein the each index fact datagram comprises a byte offset in one or more trick files corresponding to the content offering.

7. The method of claim 1, further comprising also receiving a Hypertext Transfer Protocol (HTTP) GET request for at least a portion of the content offering.

8. The method of claim 7, wherein the delivering the content is in response to the also receiving the HTTP GET request.

9. The method of claim 1, further comprising delivering trick content that is a function of data in the index fact datagram.

10. A method in a content delivery network, the method comprising:
    transmitting, with an edge server, a request for a content offering beginning at a predetermined time, the transmitting occurring at a request time occurring after the predetermined time;
    receiving, at the edge server, in response to the transmitting:
       one or more portions of the content offering;
       an index file corresponding to the one or more portions of the content offering; and
       an instruction to, when reaching a portion of the content offering occurring at the request time, obtain index fact datagrams corresponding to any additional portions of the content from a multicast server; and
    amending the index file with the index fact datagrams.

11. The method of claim 10, the transmitting comprising sending an HTTP GET Request.

12. The method of claim 10, further comprising delivering, with the edge server, trick content to a subscriber device that is a function of data in the index file.

13. The method of claim 10, the index fact datagrams comprising a byte offset in the content offering.

14. The method of claim 10, the index fact datagrams comprising a byte offset in one or more trick files corresponding to the content offering.

15. A server complex in a content delivery network, comprising:
- a central server;
- a multicast server; and
- an edge server;
- the central server comprising one or more processors to deliver, with the multicast server, a content offering to the edge server beginning at a predetermined time by transmitting, across a network, portions of content in succession, wherein each portion of content accompanied by an index fact datagram;
- the edge server comprising another one or more processors to store, in a memory device at the edge server, each index fact datagram in an index file;
- the one or more processors of the central server to receive a request for the content offering at a request time occurring after the predetermined time and to deliver one or more portions of the content offering, an index file portion comprising all index fact datagrams delivered by the multicast server between the predetermined time and the request time, and an instruction to the edge server to, when reaching a last index fact datagram of the index file portion, obtain any additional index fact datagrams corresponding to any additional portions of the content offering from the index file stored at the edge server.

16. The server complex of claim 15, the another one or more processors to deliver trick content to a client device as a function of data in one or more of the additional index fact datagrams.

17. The server complex of claim 16, the request comprising an HTTP GET request.

18. The server complex of claim 17, the index fact datagram comprising a byte offset in the content offering.

19. The server complex of claim 17, the index fact datagram comprising a byte offset in one or more trick files corresponding to the content offering.

20. The server complex of claim 17, the index fact datagram comprising a sequence number, the sequence number set to zero at the predetermined time.

* * * * *